No. 791,130. PATENTED MAY 30, 1905.
B. F. BELLOWS.
MACHINE FOR DISTRIBUTING MATRICES.
APPLICATION FILED JULY 11, 1904.

No. 791,130. PATENTED MAY 30, 1905.
B. F. BELLOWS.
MACHINE FOR DISTRIBUTING MATRICES.
APPLICATION FILED JULY 11, 1904.

No. 791,130. PATENTED MAY 30, 1905.
B. F. BELLOWS.
MACHINE FOR DISTRIBUTING MATRICES.
APPLICATION FILED JULY 11, 1904.

Witnesses.
E. B. Gilchrist
B. W. Brockett.

Inventor.

Benjamin F. Bellows,
By his Attorneys,
Thurston & Bates

No. 791,130. PATENTED MAY 30, 1905.
B. F. BELLOWS.
MACHINE FOR DISTRIBUTING MATRICES.
APPLICATION FILED JULY 11, 1904.

Witnesses.
E. B. Gilchrist
B. W. Brockett.

Inventor:
Benjamin F. Bellows
By his Attorneys,
Thurston & Bates

No. 791,130. PATENTED MAY 30, 1905.
B. F. BELLOWS.
MACHINE FOR DISTRIBUTING MATRICES.
APPLICATION FILED JULY 11, 1904.

Witnesses.
E. B. Gilchrist
B. W. Brockett

Inventor
Benjamin F. Bellows
By his Attorneys,
Thurston & Bates

No. 791,130. PATENTED MAY 30, 1905.
B. F. BELLOWS.
MACHINE FOR DISTRIBUTING MATRICES.
APPLICATION FILED JULY 11, 1904.

Witnesses.
E. B. Gilchrist
B. W. Brockett.

Inventor:
Benjamin F. Bellows,
By his Attorneys
Thurston & Bates.

No. 791,130. Patented May 30, 1905.

UNITED STATES PATENT OFFICE.

BENJAMIN F. BELLOWS, OF CLEVELAND, OHIO, ASSIGNOR, BY MESNE ASSIGNMENTS, TO ELECTRIC COMPOSITOR COMPANY, OF JERSEY CITY, NEW JERSEY, A CORPORATION OF NEW JERSEY.

MACHINE FOR DISTRIBUTING MATRICES.

SPECIFICATION forming part of Letters Patent No. 791,130, dated May 30, 1905.

Application filed July 11, 1904. Serial No. 216,043.

*To all whom it may concern:*

Be it known that I, BENJAMIN F. BELLOWS, a citizen of the United States, residing at Cleveland, in the county of Cuyahoga and State of Ohio, have invented a certain new and useful Improvement in Machines for Distributing Matrices, of which the following is a full, clear, and exact description, reference being had to the accompanying drawings.

This invention is an improvement upon the matrix-distributing mechanism disclosed in my prior patent, No. 598,408, of February 1, 1898.

The primary objects of the invention are to so modify and supplement the mechanism described in that patent as to render the proper distribution of matrices more rapid and more certain.

The invention relates to means whereby each matrix can cause the distributing-switches to move in either direction, as may be necessary, to open up a channel from the distributing-throat to the proper magazine; to the means for accelerating the passage of each matrix through the channel so opened up; to the mechanism for preserving from injury the needles which by their contact with the matrices complete the circuits of the magnets which operate the distributing-switches; to the means for moving the matrices toward said needles; to the mechanical devices between the distributing-switches and their operating-magnets; to the means for preventing injury due to "sparking" when electric circuits are broken; to the means for synchronizing the operation of the various magnets employed; to the means for locking the distributing-switches in the positions into which they have been moved, and to numerous refinements of mechanisms employed for various purposes.

The invention may be here summarized as consisting in the construction and combinations of parts which contribute to the several results.

In the drawings, Fig. 27 is a horizontal sectional view in the plane indicated by line F F of Fig. 1.

A line of matrices 1, resting upon a horizontal distributing-rail 3, is subject to a force tending always to move the line toward and to bring the foremost matrix in the line over an opening in that rail, through which matrices drop into the throat 5 of the distributing-channels 6, whose lower ends discharge into the magazines 7, in which the matrices are stored. The throat 5, which increases in width from its upper end downward, is divided into two channels by a partition 8. The two channels, which are of increasing width, are at a lower point subdivided by two diverging partitions, and these are again subdivided by other diverging partitions, and this subdivision by diverging partitions 8 is repeated until there are formed as many diverging distributing-channels as there are magazines, and these channels discharge directly into said magazines. At the upper ends of each of these subdividing partitions are movable switches 9, each of which by its movement in one direction or the other establish communication between the channel above the switch and one of the divisions thereof below the switch. These switches are arranged in groups, there being eight of such groups, the upper group containing only one switch, the next group two switches, and so on, the number of switches in each group increasing from the top downward. The switches in the six lower groups are arranged in the arcs of circles around a common center—to wit, the axis of a horizontal stud 11, which projects rearward from the machine-frame in the axial alinement with the pivot of the single switch, which constitutes the upper group. Each switch is attached to the front end of a rock-shaft 12, which passes through the upright frame member 2. On the rear end of each rock-shaft is secured a crank-arm 13, having a crank-pin 14. All of the crank-pins associated with each of the six lower groups of gates are arranged in an arc-shaped row, as shown, and they all project into notches 15 in the edge of the lower arc-shaped member of a sector-shaped swinging frame 16. There are six of these sector-shaped frames, of different sizes, all hung so as to swing freely on the horizontal stud 11. To move all of the gates in any group to one side or the other of the channels in which they are, it is only necessary to swing the corresponding frame 16 a very short distance. The rock-shaft to which the upper switch is secured passes through stud 11, and it has a crank-arm 13, carrying a crank-pin 14. The rock-shafts of the two switches in the next row are similarly provided with crank arms and pins, and the two pins are pivoted in a connecting-bar 18, which compels them to move in unison. One of the crank-arms associated with these two switches is an angle-lever, and to one arm thereof the link 19 is pivotally connected, and the lower end of this link is connected with the armature-frame of a pair of electromagnets 20 21. This pair of magnets are arranged in axial alinement and secured to the frame member 2, and the two armatures 22 23 and the rods 24, by which they are rigidly connected, constitute what will be herein referred to as the armature-frame. When one of these magnets is energized, this armature-frame is moved in one direction, and when the other magnet is energized said armature-frame is moved in the contrary direction. These movements of the several armature-frames cause the movements of the groups of switches with which they are severally associated to one side or the other of the distributing-channels in which they are placed, so as to prevent communication between each of said channels and one of its branches. A similar pair of magnets is associated with each group of switches. The magnets 25 26 are associated with the upper switch, and the armature-frame of said pair of magnets is connected with the crank-pin 14, associated with said switch, by a link 19. The pairs of magnets 27 28, 29 30, 31 32, 33 34, 35 36, 37 38 are associated, respectively, with the third, fourth, fifth, sixth, seventh, and eighth rows of switches. Each swinging frame 16 has on one side a projecting ear 34, which is connected with one arm, 40, of a rock-shaft 41, another arm, 42, of which is connected by link 19 with the armature-frame of the associated pair of magnets. Normally the circuits of all of these magnets are incomplete; but, evidently, if the circuit of any magnet is completed it will cause the movement of the associated switches, provided, of course, they are not already in the position into which that particular magnet is adapted to move them. Means are provided by which each matrix as it is moved along the distributing-rail to a position over the opening therein will complete the circuits of all of the magnets, which will move in the proper direction all of the switches which must be moved to open up an unobstructed channel from the distributing-throat to the magazine of that particular matrix. One wire of each magnet employed in the mechanism shown is connected electrically with one pole of an electric generator 4 at all times except for brief intervals, to be presently referred to. The other pole of the generator is connected with the machine-frame. When, therefore, the other wire of a magnet is electrically connected with the machine-frame, the circuit of that magnet is completed, and the magnet will do its work.

Figure 14:
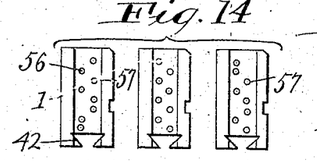
Fig. 14 is a side view of three of the matrices.
Figures 15, 16:
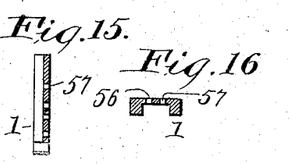
Fig. 15 is a longitudinal section of one of said matrices.
Fig. 16 is a transverse sectional view thereof.
Figure 17:
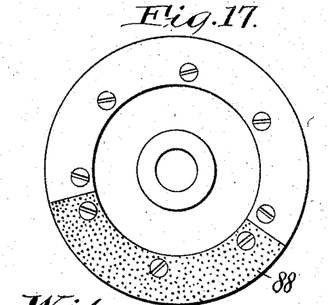
Figs. 17 and 18 are side views of two of the commutator-disks, to be hereinafter explained.
Figures 18, 19, 20:
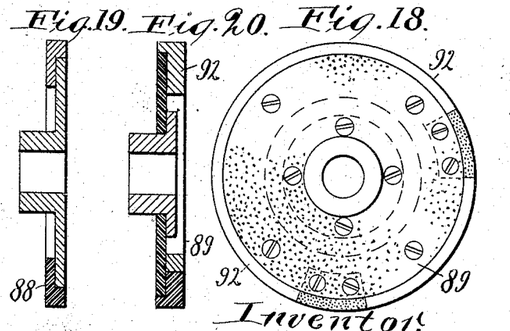
Figs. 19 and 20 are central sectional views of the two disks shown in Figs. 17 and 18, respectively.
Figures 21, 22, 23, 24:
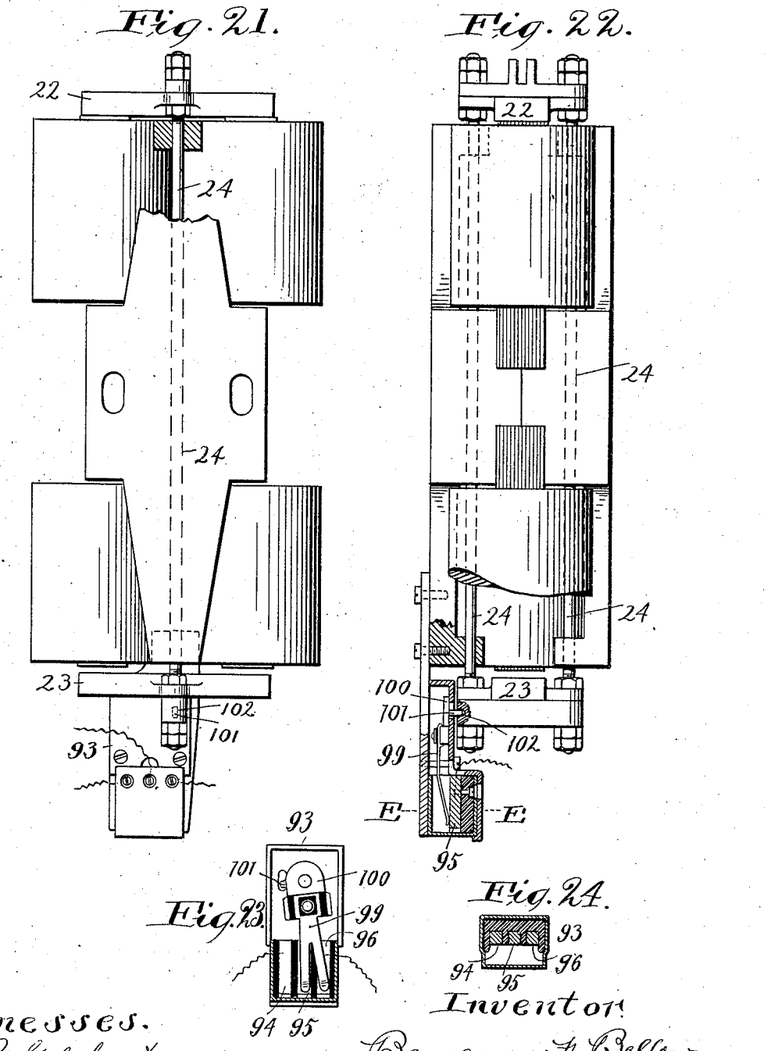
Fig. 21 is a rear view of one associated pair of magnets.
Fig. 22 is a side elevation thereof with an associated electrical switch shown in section.
Fig. 23 is a sectional rear view of one of said switches.
Fig. 24 is a transverse sectional plan view thereof on line E E of Fig. 22.
Figure 26:
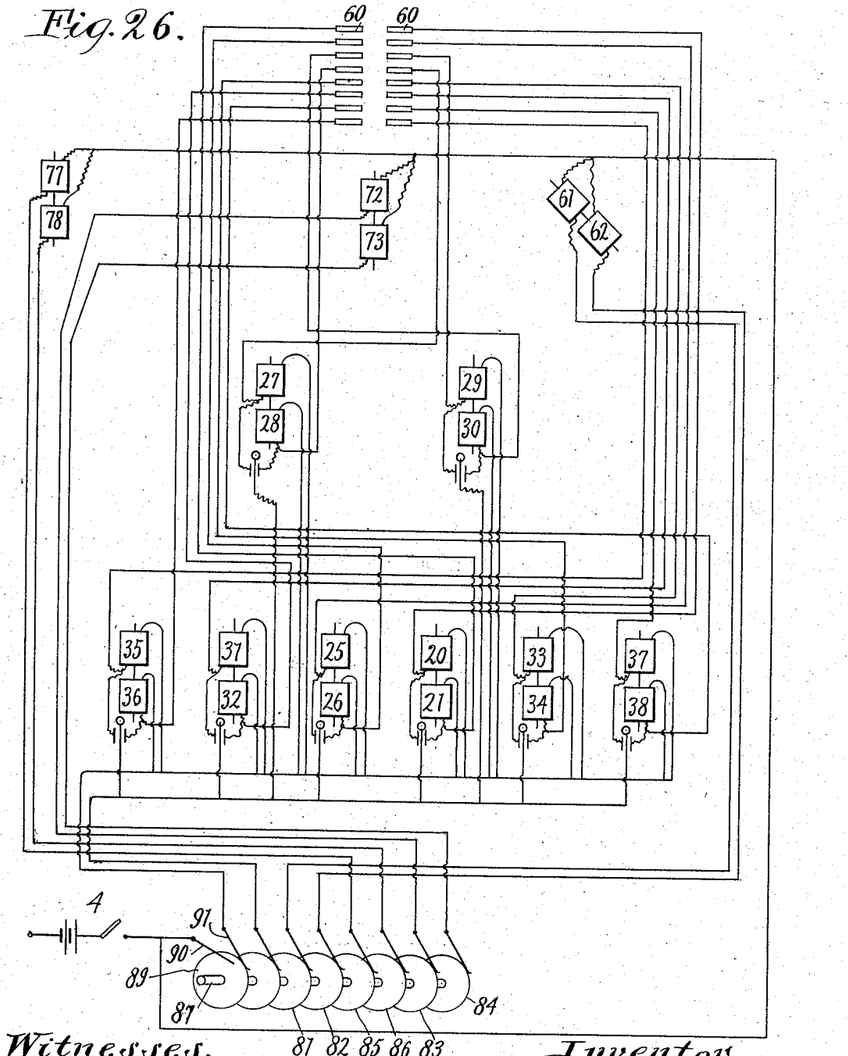
Fig. 26 is a diagrammatic view of the several magnetic circuits.

The matrices 1, which are shown in Figs. 14, 15, and 16, are thin pieces of brass having in one edge a character depression. In the lower end of each matrix there is a dovetailed notch 42, which loosely fits over the dovetailed tongue 43, projecting up from the distributing-rail 3 and extending the whole length thereof. This rail is horizontal, extends transversely of the machine, and is located, as stated, above the distributing-throat. It is of no consequence to the present invention how the line of matrices is placed upon this rail. It may be done in substantially the manner set forth in said prior patent. It is of no consequence generally to the present invention as to how the line of matrices is subjected to a force constantly impelled toward the opening of said rail. The mechanism for doing this may be substantially as shown in said prior patent, or it may consist of a propeller-slide 44, located behind the distributing-rail and movable in a path parallel thereto, said slide having on one edge rack-teeth 45, which engage with a rotatable pinion 46, and this pinion may be caused to rotate to produce the desired movement of said propeller-slide by a vertically-movable slide 47, having rack-teeth in its edge, which also engage with the same pinion. The weight of this vertically-movable slide imparts the desired movement to said pinion. In this propelling mechanism the force of gravity is therefore the force which ultimately causes the movement of said matrices along the distributing-rail. This force, however, acts too slowly for efficient work. There is therefore applied to the slide 44 a spring-actuated presser-bar 48, the right-hand end of which bears against the rear matrix in the line. This bar is slidable in a bracket 49, which projects forwardly from the propeller-slide, and said presser-bar is under the influence of a spring 50, tending to press it always to the right and against the matrix-line to move it in the desired direction. When one matrix is discharged from the rail and the rest of the matrix-line is permitted to move, this presser-bar acts to impart immediate movement thereto until the matrix-line is prevented from moving any farther by engagement with a guard stop-plate 51. Then gravity, acting upon the vertical slide, causes the other slide to so move as to compress the spring-actuated presser-bar, and thus set it in readiness to repeat its operation.

The opening in the distributing-rail is adapted to be closed by a short horizontal gate 52, which when closed becomes a substantial continuation of the rail. This gate is rigidly attached to the movable slide 53, which is moved at the proper time to the right, so as to withdraw the gate 52 and permit the matrix which was resting thereon to drop through the rail into the distributing-throat. This slide carries a plurality of insulated metallic contact-needles 54 55, which are arranged in two vertical rows with their ends directed toward the right-hand face of the foremost matrix in the line of matrices on the distributing-rail. The longitudinal central portion of all matrices are of the same thickness, all of the matrices, except the very thinnest, being vertically grooved to produce this uniformity of thickness. The matrices themselves are provided in this central thin portion with two rows of holes 56 57 and intermediate contact-surfaces arranged opposite the ends of these needles, so that as the slide 53 and matrix are moved toward each other some of these needles will make an electrical contact with the matrix, and so through it complete the electrical connection between said needles and the machine-frame; but those needles opposite holes in the matrix will not touch the matrix, but will pass into said holes, and so will not make electrical contact through it with the machine. These several needles are connected in pairs with the pairs of electromagnets by which the distributing-switches are moved—that is to say, the two upper needles, one in each row, are connected the one with the upper and the other with the lower magnet of one pair of magnets. The next to the top needle in each row are connected, respectively, with the upper and lower magnets of another pair of magnets, and so on. The holes in the matrices are placed so that whenever there is a hole in the place set apart therefor in one vertical row there is no hole in the corresponding place in the other vertical row. Therefore when contact is made between the needles and matrix only one magnet of a pair will be energized at the same time. The holes and contact places on the several matrices are so placed that each one will complete the circuit of and will energize those particular magnets which, by their action, will swing the proper rows of switches into the proper positions to open up that distributing-channel only whose lower end discharges into the magazine associated with the particular matrix which so completes said circuits.

The primary and most important difference between the distributing mechanism herein shown and that which is shown in the prior patent hereinbefore referred to is that in said prior patent each matrix had only one group of holes and contact-faces and there was only one electromagnet associated with each group of switches. Each matrix would complete the circuits of the proper magnets to move the switches, so as to open up the proper channel. Then after the matrix had passed through that channel and the circuits of the magnets were again broken other mechanism operated to return said gates to their initial position, from which they would be again temporarily moved by the described action of the next matrix. In the present mechanism, however, the return of the switches to an initial position does not take place after each matrix has been delivered to its magazine. Each matrix completes the circuit of these magnets, which will move the switches from whatever position they may be found in to the position in which they must be in order to open up the proper channel. Distribution is about twice as rapid as with the old mechanism. The needles 54 55 are movable endwise in the recesses in the slide 53, their forward movement therein—that is to say, the movement toward the matrices—being limited by the shoulders 65. Each of these needles is yieldingly pressed forward in the gate-keeper by spring-wires 58, each of which enters a slot in the rear end of a needle. These wires act also as conductors of the current, their front ends being severally secured to the conductor-plates 60, which are secured to a fixed insulating-plate 59. These conductor-plates are electrically connected with one side of the corresponding electromagnet.

The slide 53 is capable of sliding toward and from the matrix-line on the distributing-line, and it is caused to so move by a pair of electromagnets 61 62, which act upon it through the bell-crank lever 63, which is pivoted to frame member 2 and to the slide and is connected by a link 64 with the armature-frame of said pair of magnets. Between the slide 53 and the foremost matrix in the line is the guard-plate 51, this being a piece of slightly-springing metal supported at its upper end and capable of yielding slightly to the right. In this plate are two rows of holes 66 opposite the ends of the needles 54 55. These holes are so large that the needles may pass through them without contact, and they do pass through them when the slide is moved to the left, and thereby said needles are able to contact with the opposed contact-surface on the matrix. When the slide moves to the right to open the gate 52 in the distributing-throat and permit the matrix to fall, the ends of the needles are withdrawn into this guard-plate and are so withdrawn before the gate passes from beneath the matrix. When, therefore, the matrix falls, it cannot rub upon and therefore bend the needles.

In the machine is an accelerator by which when the switches have been properly placed by the action of the electromagnets and the gate in the distributing-rail has been withdrawn the matrix then ready for distribution is given a quick impulse downward, which impulse is of sufficient force to move it very rapidly down through the open channel to its magazine. In the former mechanism the force of gravity alone was relied upon to cause the matrices to move to their magazines. The accelerator in this machine above referred to is a vertically-movable slide 67, placed in a position where its lower end may engage with the top of the foremost matrix in the line—namely, with that matrix which is making the contacts with the proper needles to operate the distributing-switches. In the rear side of this slide is a notch 68, into which projects the front end of a spring 69. The rear end of this spring is secured to a pivoted lever 70, and this pivoted lever is connected to a link 71, whose lower end has suitable connections with the armature-frame of the pair of magnets 72 73. When the lower magnet of the pair has its circuit completed, the lever is drawn downward, thereby moving the accelerator-slide down into contact with the top of the matrix about to be distributed and putting the spring 69 under tension. Then the gate-keeper withdraws the gate from beneath this matrix, and the force of the spring acting upon the accelerator-slide impels said matrix rapidly down into the distributing-throat and thence to its magazine.

In order to prevent any matrix but the foremost matrix of the matrix-line from falling through the opening in the distributing-rail when the gate is withdrawn, a pinch 74 is provided which engages with the second matrix, this pinch being an upturned arm attached to a horizontal rock-shaft 75, mounted in bearings just below the distributing-rail. This arm is moved against the front edge of the second matrix and presses it backward and pinches it between itself and a bearing-surface 76, against which the rear edge of said matrix is pressed. This pinch is operated by a pair of electromagnets 77 78, whose armature-frame is connected by a link 79 with a forwardly-projecting arm 80, attached to the pinch-shaft 75. The energizing of one magnet of the pair rocks the shaft in one direction, and the energizing of the other magnet rocks it in the other direction. As before stated, all of the electromagnets are normally inert, their circuits being incomplete. It is obviously necessary that the circuits shall be completed and broken in proper sequence and at the proper times, substantially as follows: The electromagnet 61 is first energized, whereby the slide 53 is moved to close the gate over the distributing-throat. Then as the foremost matrix in the line is moved onto this gate it contacts with the proper needles by which the circuits of the proper switch-magnets are completed through the matrix to the machine-frame. The proper movement of the switches follow. Simultaneously, or practically so, the pinch-magnet 77 operates the pinch to grasp the second matrix. The accelerator-magnet 72 is also energized, whereby the spring tension is applied to the top of the first matrix. Then the circuit of the magnet 61 is broken and the circuit of the companion magnet 62 is closed, whereupon the slide is withdrawn. Immediately the first matrix is impelled down through the distributing-channel. Then the circuit of the accelerator-magnet 72 is broken and the circuit of the companion magnet 73 is closed, thereby withdrawing the accelerator-slide. The circuit of the pinch-magnet 77 is broken and the circuit of the companion magnet 78 is closed, thereby withdrawing the pinch. This permits the propeller-slide to move the matrix-line toward slide 53, whose magnet 61 in the meantime has had its circuit closed, whereby the said gate-keeper is moved toward the matrix-line, so as to be able to make the necessary contacts between the needles and the matrix. These operations are repeated with very great rapidity, so rapid, in fact, that more than a hundred matrices can be distributed each minute.

Figures 1, 2:
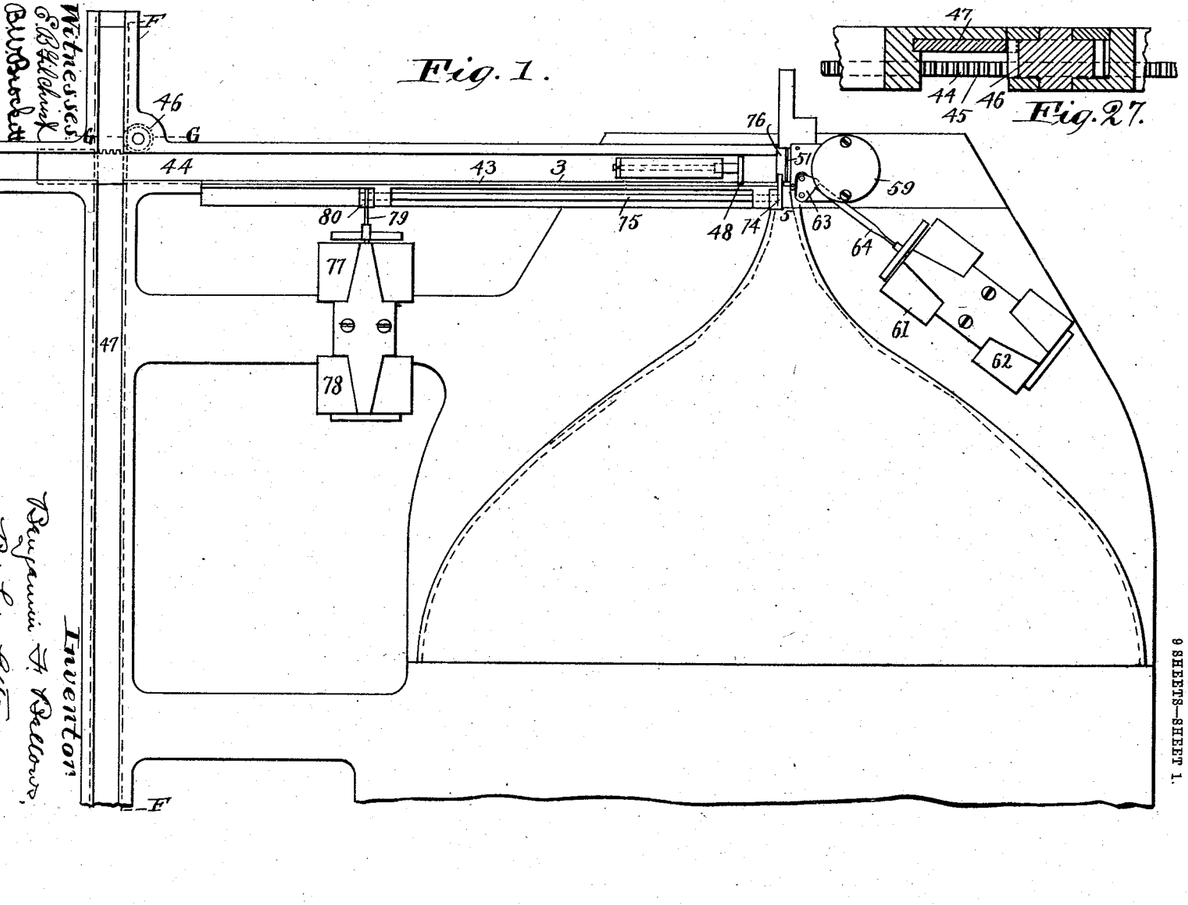
Figure 1 is a front elevation of the distributing part of a machine embodying my invention.
Fig. 2 is a front view of the distributing channels and switches therein when the front plate, which covers them, is removed.
Figure 2:
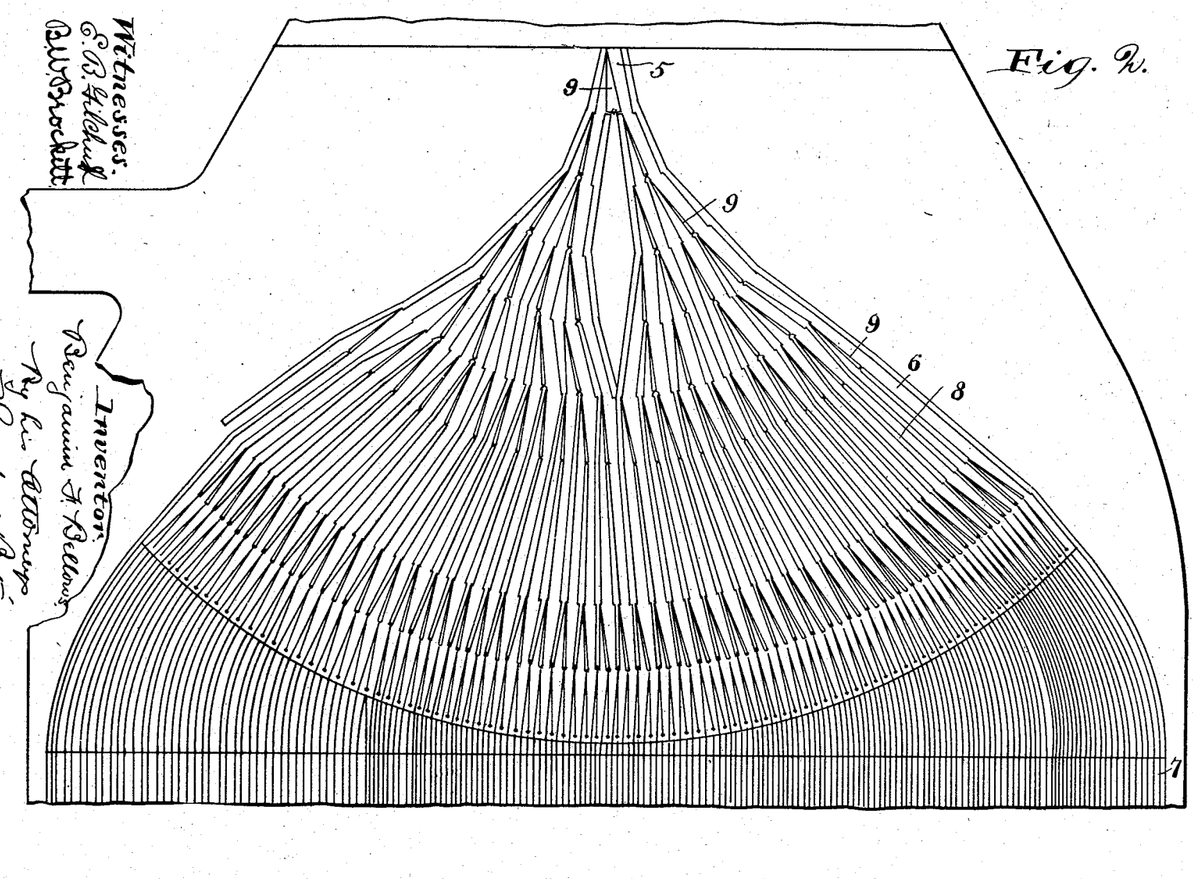
Figure 3:
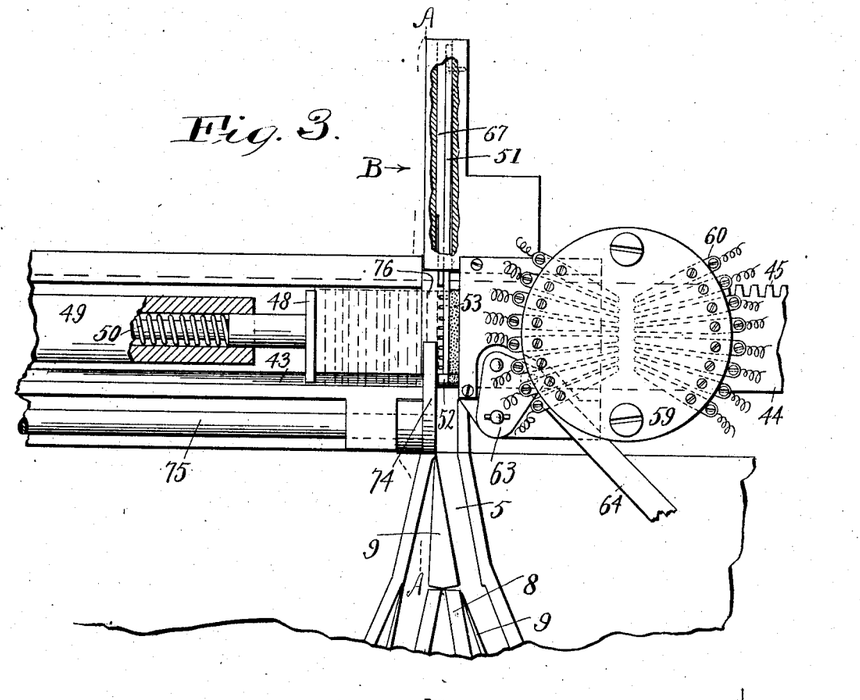
Fig. 3 is a front elevation (full size) of the mechanism above and adjacent to the throat or entrance to the distributing-channels.
Figure 4:
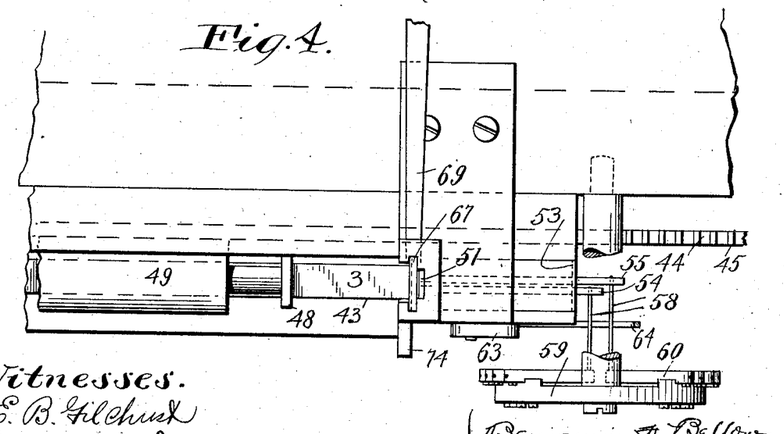
Fig. 4 is a plan view of the parts shown in Fig. 3.
Figure 5:
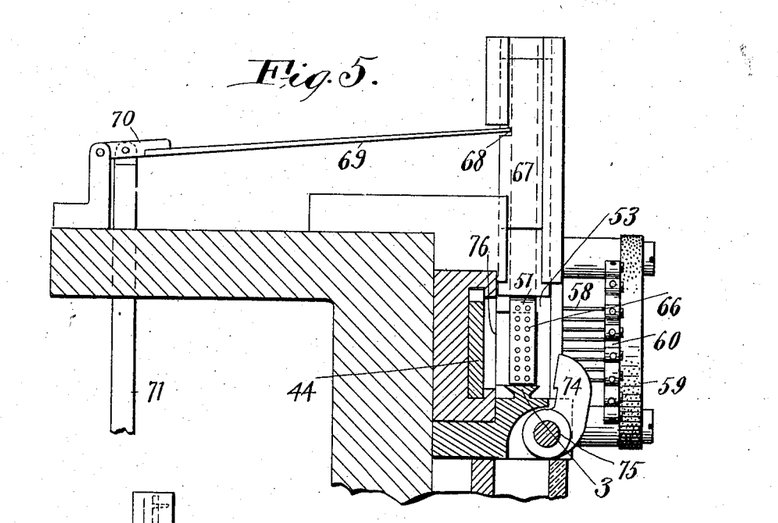
Fig. 5 is a sectional view on line A A of Fig. 3 looking in the direction of arrow B.
Figure 6:
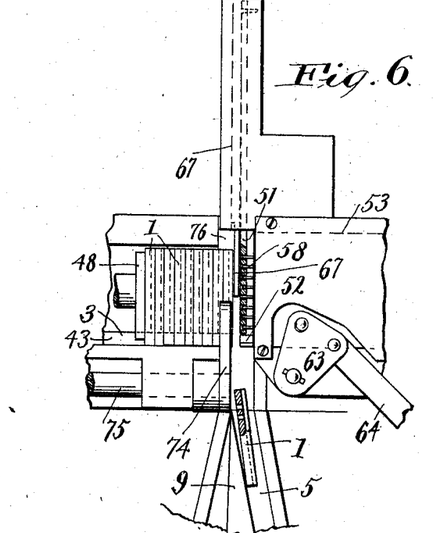
Fig. 6 is a front elevation of the mechanism shown in Fig. 3 just after a matrix has been discharged into the distributing-throat.
Figure 7:
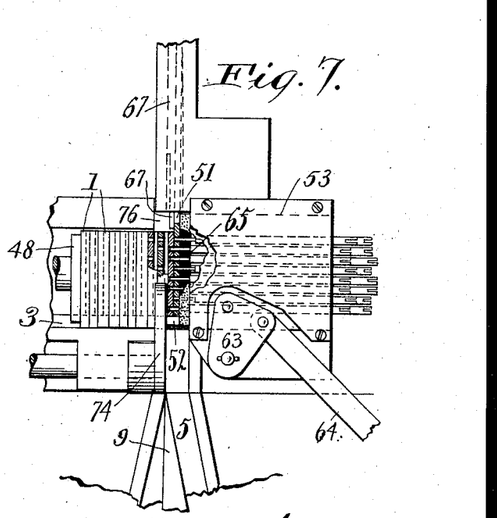
Fig. 7 is a view of some of the same parts, showing their position just before the matrix has been discharged.
Figures 8, 25:
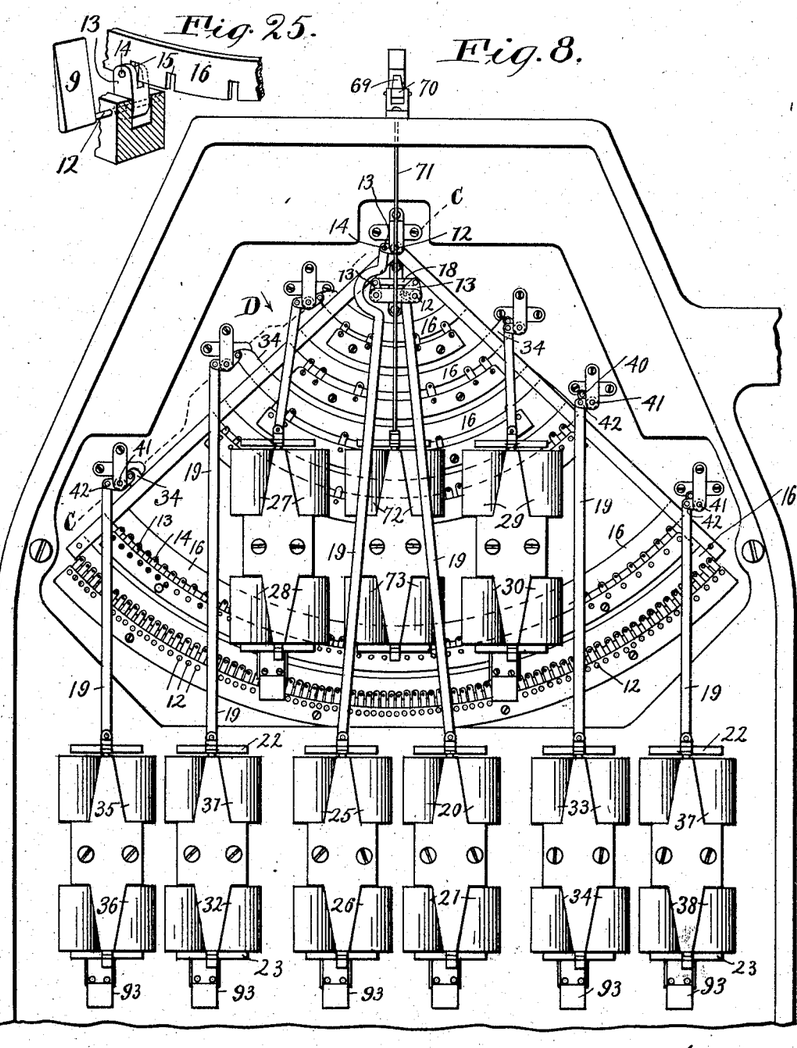
Fig. 8 is a rear elevation of the mechanism for operating the gates.
Fig. 25 is a perspective detail, partly in section, showing one of the gates 9, a part of a swinging frame 16, and the mechanism for transmitting motion from said frame to said gate.
Figure 9:
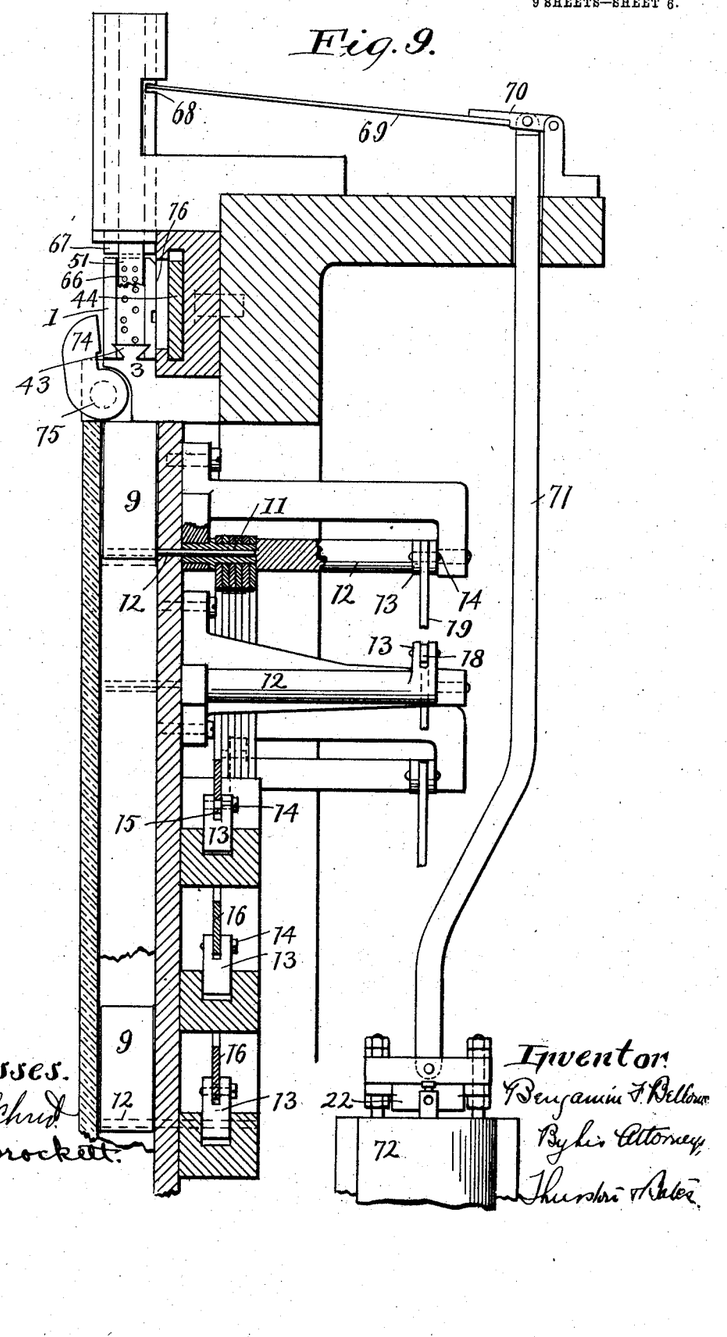
Fig. 9 is a central vertical sectional side elevation of the upper part of the machine.
Figure 10:
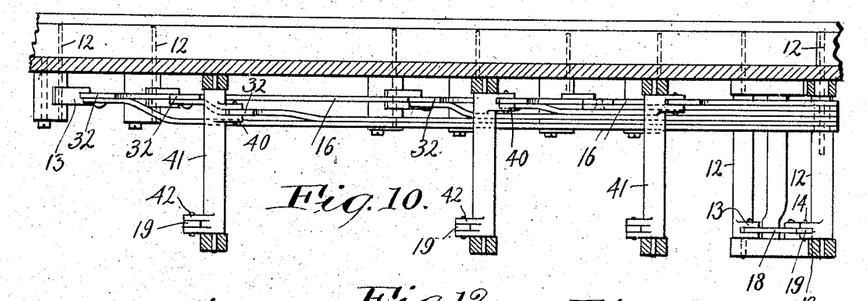
Fig. 10 is a sectional view on line C C of Fig. 8 looking in the direction of arrow D.
Figures 11, 12:
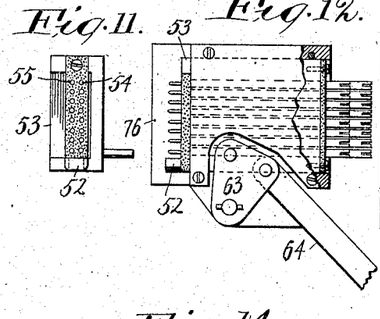
Fig. 11 is an end view of the needle-slide.
Fig. 12 is a front view of the same, its support, and some of its operating mechanism.
Figure 13:
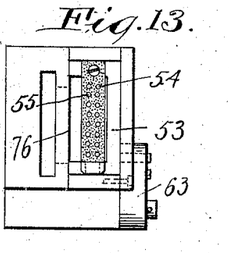
Fig. 13 is an end view of the parts shown in Fig. 12.

The circuits of the several magnets will be understood from the following description, in connection especially with the diagrammatic Fig. 25. As has been stated, each magnet is connected with one pole of the electric generator, the other pole of said generator being connected with the machine-frame. When the other wire of any magnet is electrically connected with the machine-frame, the circuit of that magnet is complete. As will be seen from Fig. 25, there is a permanent connection between the generator and one side of the magnets 61 62, 72 73, and 77 78, these being the magnets for the gate-keeper, the accelerator, and the pinch, respectively. The connections between these several magnets and the machine-frame are made and broken at the proper times and in proper sequence by the commutator-disks 81 82, 83 84, 85 86, and their associated brushes. These disks are made of metal attached to a rotating metal shaft 87; but insulating-sections 88 are set into the peripheries of these disks at the proper points to break the circuits at the proper times, as before stated. The switch-magnets, however, have no permanent connection with the electric generator, but the connection is made by means of a commutator-disk 89 and two brushes 90 91, which are respectively connected with the generator and one side of all the switch-magnets. This disk 89 is made of insulating material; but it has a metallic section 92 secured to it, with which both of said brushes may contact, and thereby electrically connect one pole of these magnets with the generator. The other poles of these magnets are severally connected electrically with the contact-needles, whereby when a metallic matrix touches any needle the circuit of the corresponding magnet is completed and the corresponding switches are moved in the proper direction; but obviously when the slide 53 is withdrawn, which happens before the matrix drops, these electric contacts are broken and the magnets again become inert. It may be expected, however, that the switches will remain in the position into which they have been moved; but because of the serious consequences which would result from any accidental displacement of the switches before the matrix has reached its magazine means are provided for temporarily locking the switches in place. This is effected by providing means whereby the movement of any armature-frame operates a switch, which completes through another path the circuit of that magnet which caused the movement of said armature-frame. Each pair of switch-magnets is provided with one of these electrical switches. Each switch device consists of a box 93, containing three insulated contact-plates 94 95 96, of which the middle one is connected with the brush 97 of a commutator-disk 98, and the two outer plates are connected, respectively, to the wires of the two associated magnets. A pivoted insulated switch-lever 99 has two legs, one of which may contact with the middle plate, while the other leg will contact with one or the other of the outer plates. This switch-lever is secured to a pivoted rocker 100, having a bent arm 101, which extends out of said box and enters a notch 102 in the associated armature-frame. The movement of the armature-frame therefore moves this rocker and the attached switch-lever, so as to make an electrical connection between the brush 97 and that magnet of the pair which caused the armature to move. The commutator-disk 98 is of metal and has an insulating-section set with it. While the brush contacts with the metal part of said disk and when the switch 99 has been moved that completes the magnet-circuit which had the instant before been completed through the matrix, the metallic part of the commutator-disk remains in contact with the brush until the matrix has reached its magazine, and then the insulated part of the disk comes into contact with the brush. This breaks the electrical circuits, and this condition of things continues while the next matrix is making its contact with the needles and completes the circuits of the proper magnets. The employment of these commutator-disks, all secured to the same rotating shafts as the means for making and breaking the magnet-circuits in proper sequence, has in addition to its simplicity and certainty of operation the advantage that substantially all of the wear due to sparking when electrical circuits are broken is on the commutator-disks.

Having described my invention, I claim—

1. In a matrix-distributing machine which has diverging distributing-channels and partitions by which said channels are subdivided and thereby increased in number from the top downward, the combination of movable switches in said channels at the upper ends of said partitions, and operating mechanisms connected with groups of said switches, with means whereby each matrix will cause movement of the proper switch-operating mechanisms in either direction, as required to open up a channel through which said matrix may slide to its own magazine.

2. In a matrix-distributing machine which has diverging distributing-channels and diverging partitions by which said channels are subdivided and thereby increased in number from the top downward, the combination of movable switches in said channels at the upper ends of said partitions, and operating mechanisms connected with groups of said switches, with pairs of electromagnets, an armature-frame associated with each pair of magnets, power-transmitting mechanisms each of which connects an armature-frame with the operating mechanism of a group of switches, the circuits of said magnets being normally incomplete, and mechanism whereby each matrix will complete the circuits of those magnets which will, through the said intermediate mechanism, throw the proper groups of switches in the proper directions to open up a channel through which said matrix may pass into its own magazine.

3. In a matrix-distributing machine which has diverging distributing-channels and partitions by which said channels are subdivided and thereby increased in number from the top downward, the combination of movable switches in said channels at the upper ends of said partitions, and operating mechanisms severally connected with groups of said switches, with pairs of electromagnets, an armature-frame associated with each pair of magnets, power-transmitting mechanisms which severally connect each of said armature-frames with the operating mechanism of a group of switches, the circuits of said armatures being normally incomplete on one side, a plurality of matrices having holes and contact-surfaces, two series of contact-needles which are severally connected with the incomplete sides of said pairs of magnets and against which said matrices may be severally moved with the result of completing the circuits of those magnets which will cause the movement of the proper switches in either direction as required to open up channels through which the matrices will slide to their own magazines.

4. In a matrix-distributing machine containing diverging distributing-channels which are increased in number from the top downward by diverging partitions, an arc-shaped row of switches in said channels at the upper ends of said divided partitions, rock-shafts secured to said switches, crank-arms secured to said rock-shafts and carrying crank-pins, a swinging frame having an arc-shaped lower member in which are a plurality of notches which embrace said crank-pins, a pair of electromagnets having normally incomplete circuits, an armature-frame associated with said pair of magnets, mechanism intermediate of said armature-frame and said swinging frame whereby to move the latter, and means for completing the circuit of either magnet without at the same time completing the circuit of the other, whereby said swinging frame may be moved in either direction.

5. In a machine for distributing matrices which contains a plurality of magazine-channels and a plurality of distributing-channels which, at their lower ends, discharge into said magazines and which converge toward their upper ends, being progressively merged together to form ultimately a single distributing-throat, switches pivoted in said channels at the upper ends of said partitions, said switches being arranged in arc-shaped rows, a crank-arm secured to each switch-pivot and provided with a crank-pin, a plurality of rocking frames whose lower members are arc-shaped and have notches into which said crank-pins project, and means for independently rocking said swinging frames.

6. In a machine for distributing matrices which contains a plurality of magazine-channels and a plurality of distributing-channels which, at their lower ends, discharge into said magazines and which converge toward their upper ends, being progressively merged together to form ultimately a single distributing-throat, pivoted switches in said channels at the upper ends of said partitions, said switches being arranged in arc-shaped rows, a crank-arm secured to each switch-pivot and provided with a crank-pin, a plurality of rocking frames whose lower members are arc-shaped and have notches into which said crank-pins project, pairs of electromagnets, an armature-frame associated with each pair of magnets, mechanisms connecting said armature-frame with a rocking frame, and means whereby any matrix will complete the circuit of the magnets by which the proper rocking frames are moved in the proper direction to open up a channel from the distributing-throat to this magazine which is associated with said matrix.

7. A series of matrices each having two series of transverse holes and intervening contact-surfaces, whereof the holes of one series are opposed to the contact-surfaces of the other series, and whereof the matrices differ from one another in respect to the arrangement of said holes and contact-surfaces.

8. A matrix having in one side a vertical groove extending from top to bottom and having in said grooved portion two rows of holes and intervening contact-surfaces, the holes in one series being opposed to the contact-surfaces in the other series.

9. A series of matrices each having in one side a vertical groove extending from top to bottom of such depth that the thicknesses of the grooved portions are the same in all of the matrices, there being in said grooved portion two rows of holes and intervening contact-surfaces which holes and contact-surfaces are differently arranged on different matrices.

10. A matrix having two series of transverse holes and contact-faces whereof the holes in one series are opposed to the contact-faces in the other series.

11. In a machine for distributing matrices which contains a plurality of magazine-channels and distributing-channels which, at their lower ends, discharge into said magazines and which converge toward their upper ends, being progressively merged together to form ultimately a single distributing-throat, switches arranged in said channel, means for operating said switches, a distributing-rail above said throat having a longitudinal tongue on its upper surface, a horizontally-movable gate adapted to close the opening to said throat and to thereby form a continuation of said distributing-rail, and matrices which have dovetail notches in their lower ends for embracing said tongue.

12. In a machine for distributing matrices, the combination of a distributing-rail having an opening through it, a horizontally-movable gate for closing said opening, distributing-channels below said opening, and means for imparting to a matrix resting upon said gate an impulse which carries it rapidly through the opening when the gate is withdrawn.

13. In a matrix-distributing machine having a distributing-throat, the combination of a distributing-rail having an opening to said distributing-throat, a horizontally-movable gate for closing said opening, and operating mechanism for the gate, with a vertically-movable accelerator-slide adapted to bear upon the top of a matrix resting upon said gate, a spring engaging with said slide to move it, and mechanism for moving the spring to put it under tension impelling the accelerator-slide downward just before said gate is withdrawn, and for subsequently moving said spring in the contrary direction to lift said accelerator-slide.

14. In a matrix-distributing machine having a distributing-throat, the combination of a distributing-rail having an opening to said distributing-throat, a horizontally-movable gate for closing said opening, and operating mechanism for the gate, with a vertically-movable accelerator-slide located over said opening, a rock-shaft, a spring-arm secured thereto and engaging in a notch in said slide, an operating-arm secured to said rock-shaft, a pair of electromagnets arranged in line, an armature-frame associated with said magnets, a link connecting said armature-frame with said operating-arm, and means for independently making and breaking the circuits of said magnets.

15. In a matrix-distributing machine having a distributing-throat, the combination of a distributing-rail having an opening to said distributing-throat, a horizontally-movable gate for closing said opening, and operating mechanism for the gate, with a vertically-movable accelerator-slide located over said opening, a rock-shaft, a spring-arm secured thereto and engaging in a notch in said slide, an operating-arm secured to said rock-shaft, a pair of electromagnets arranged in line, an armature-frame associated with said magnets, a link connecting said armature-frame with said operating-arm, and revolving commutators for completing the circuits of said magnets in proper sequence.

16. In a machine for distributing matrices, the combination of a distributing-rail having an opening through it, distributing-channels whose receiving-throat is below said opening, switches in said channels, mechanism which is caused to operate by the foremost matrix in the line of matrices for operating said switches, a slide subject to a constant force tending to move it in a path parallel to the distributing-rail, and a spring-actuated pressure-bar secured to said slide and bearing against the rear matrix in the line.

17. In a matrix-distributing machine which contains a plurality of magazine-channels and distributing-channels which at their lower ends discharge into said magazine-channel and which converge toward their upper ends, being progressively merged together to form ultimately a single distributing-throat, a distributing-rail having an opening into said throat, combined with a propeller for moving the matrices along said rail toward said throat, a weight for actuating said propeller, and a spring-actuated presser-bar mounted upon said propeller and overhanging the distributing-rail.

18. In a matrix-distributing machine, having distributing-channels which converge toward their upper ends and are ultimately merged into a single distributing-throat, the combination of a distributing-rail having an opening to said throat, a movable gate for closing said opening, and mechanism for moving it, with a horizontally-movable rack-slide, a pinion with which said rack-slide engages, a vertically-movable rack-slide also engaging said pinion, and a presser-bar secured to the horizontally-movable rack-slide and extending over the distributing-rail.

19. In a matrix-distributing machine, having a distributing-throat, the combination of a distributing-rail having an opening through it, a horizontally-movable rack-slide, a pinion with which said rack-slide engages, a vertically-movable rack-slide also engaging said pinion, and a spring-actuated presser-bar secured to the horizontally-movable rack-slide and extending over the distributing-rail.

20. In a matrix-distributing machine having distributing-channels which converge toward their upper ends and are merged ultimately into a single distributing-throat, a distributing-rail having an opening discharging into said throat, a movable horizontal gate for closing said opening, and mechanism for withdrawing said gate, combined with a rack-slide, a pinion engaging therewith to move it, a weight for moving said pinion, a spring-actuated presser-bar secured to said slide, and a movable pinch for grasping and releasing the second matrix.

21. In a matrix-distributing machine having distributing-channels, the combination of a distributing-rail having an opening to the receiving-throat of said channels, a movable gate in line with the rail and adapted to support the foremost matrix in the line, means acting constantly to press the matrix-line toward said gate, means for withdrawing said gate, a pinch for engaging with the second matrix in the line, a pair of electromagnets for operating said pinch, and commutators for completing the circuits of said magnets in proper sequence.

22. In a matrix-distributing machine having distributing-channels and switches therein, the combination with a distributing-rail having an opening to the receiving-throat of said channels, a slide carrying a plurality of contact-needles arranged in two groups, a plurality of pairs of alined electromagnets, of which the electromagnets of each pair respectively is connected with a contact-needle in each group, mechanisms operated by said pairs of electromagnets for moving said switches mechanism for moving said slide backward and forward, a matrix having two group-holes and contact-surfaces which are opposed to the two groups of needles when the matrix is on the distributing-rail, whereby the contact of the needles with the opposed contact-surfaces on each matrix will complete the circuits of those magnets with which the contacting needles are severally connected.

23. In a machine for distributing matrices, the combination of a distributing-rail having an opening, a slide movable toward and from said opening, a plurality of parallel insulated contact-needles mounted in said slide and capable of endwise movement therein and having notches in their rear ends, with a plurality of spring-wires entering said notches and subjecting said needles to a tendency to endwise movement, a pair of electromagnets, an armature-frame associated therewith, connections between said armature-frame and said slide, and commutators for completing the circuits of said magnets at proper intervals.

24. In a machine for distributing matrices, a movable slide carrying a plurality of contact-needles, a pair of electromagnets, an armature-frame associated therewith, power-transmitting mechanism intermediate of said frame, and slide, and commutators for independently completing the circuits of said magnets.

25. In a matrix-distributing machine, the combination of a movable slide carrying a plurality of parallel insulated contact-needles, a distributing-rail having an opening and adapted to support matrices, mechanism for applying to a matrix-line upon said rail a force tending constantly to move said line toward said slide, and a guard-plate having perforations through which said needles may project into contact with a matrix, a gate secured to said slide for closing the opening in said rail, and means for moving said slide backward and forward.

26. In a machine for distributing matrices, the combination of a distributing-rail having an opening, a slide movable toward and from the opening in said rail and carrying a gate for closing said opening, a plurality of contact-needles carried by said slide, and a guard-plate arranged between the slide and opening and having perforations for the passage of said needles.

27. In a machine for distributing matrices, a slide made partly of insulating material, a plurality of parallel contact-needles movably mounted in said insulating material and having shoulders which limit their forward movement and having notches in their rear ends, a plurality of spring-wires engaging in said notches and forcing said needle forward, and mechanism for imparting to said slide a backward-and-forward movement.

In testimony whereof I hereunto affix my signature in the presence of two witnesses.

BENJAMIN F. BELLOWS.

Witnesses:
E. L. THURSTON,
ALBERT H. BATES.